United States Patent

[11] 3,586,382

| [72] | Inventor | Alan R. Pitkanen<br>2481 Bayshore Drive, Newport Beach,<br>Calif. 92660 |
|---|---|---|
| [21] | Appl. No. | 865,101 |
| [22] | Filed | Oct. 9, 1969 |
| [45] | Patented | June 22, 1971 |

[54] TRANSPORTATION SYSTEM
8 Claims, 4 Drawing Figs.

| [52] | U.S. Cl. | 302/29, 104/23, 104/155, 302/31 |
|---|---|---|
| [51] | Int. Cl. | B65g 53/04 |
| [50] | Field of Search | 302/2, 29, 31; 104/23 FS, 155 |

[56] References Cited
UNITED STATES PATENTS

| 3,266,848 | 8/1966 | Pitkanen | 302/29 |
| 3,279,863 | 10/1966 | Bouladon et al. | 302/29 |
| 3,283,920 | 11/1966 | Schonfelder et al. | 302/29 |

*Primary Examiner*—Andres H. Nielsen
*Attorney*—Jessup & Beecher

ABSTRACT: An improved transportation system is provided by which vehicles, or articles in general, may be propelled along a roadbed on a cushion of pressurized fluid. The roadbed is provided with a grating which defines a series of vents through which the pressurized fluid escapes. The inner surface of the grating is normally closed by a flexible belt which extends along the roadbed, and in which a traveling wave is introduced progressively to open the vents and permit the fluid to escape and thus support and propel the vehicle. The system and apparatus to be described includes such a belt disposed in a vertical plane for reasons to become apparent as the description proceeds.

INVENTOR:
Alan R. Pitkanen 3,586,382

1

TRANSPORTATION SYSTEM

BACKGROUND OF THE INVENTION

The transportation system of the present invention is of the general type described in U.S. Pat. No. 3,266,848, which issued Aug. 16, 1966, in the name of the present inventor. A transportation system is described in the patent in which a vehicle is propelled along a roadbed while supported on a cushion of escaping pressurized air traveling longitudinally along the path of the vehicle. The system described in the patent comprises a roadbed for conducting a flow of pressurized air, a series of stationary fans or air blowers which induce a flow of air at low pressure into a duct or plenum chamber under the roadbed and through a grating extending along the roadbed, and a traveling wave flexible belt positioned in the plenum chamber horizontally underneath the roadbed which serves as a valving means for the pressurized air, so that the vehicle may be supported on a cushion of the pressurized air and move under the influence of the valving means so as to be propelled along the roadbed.

As mentioned above, the transportation system of the present invention is of the same general type as that described in the aforesaid patent. However, the improved system of the present invention is constructed in such a manner that the traveling wave valving flexible belt may be mounted in a vertical, rather than in a horizontal plane. By such a structural combination, the roadbed need not extend in a straight line, but may turn sharply to the left or right whenever necessary, without creating any problems insofar as the traveling wave valving belt is concerned. Moreover, with the belt disposed in a vertical, rather than a horizontal plane under the roadbed, the weight of the belt is not a factor tending to move the belt away from the grating surface upon the loss of pressure, with subsequent difficulties in returning the belt to its original position when pressure is restored, as is the case with the previous system. The vertical configuration also allows for the possibility of more than one belt being used, for example on opposite sides of the grating. This latter feature is especially important where the valving control is to be transferred from one belt to another without loss of the continuity of airflow.

DETAILED DESCRIPTION OF THE ILLUSTRATED EMBODIMENT

Figure 1:
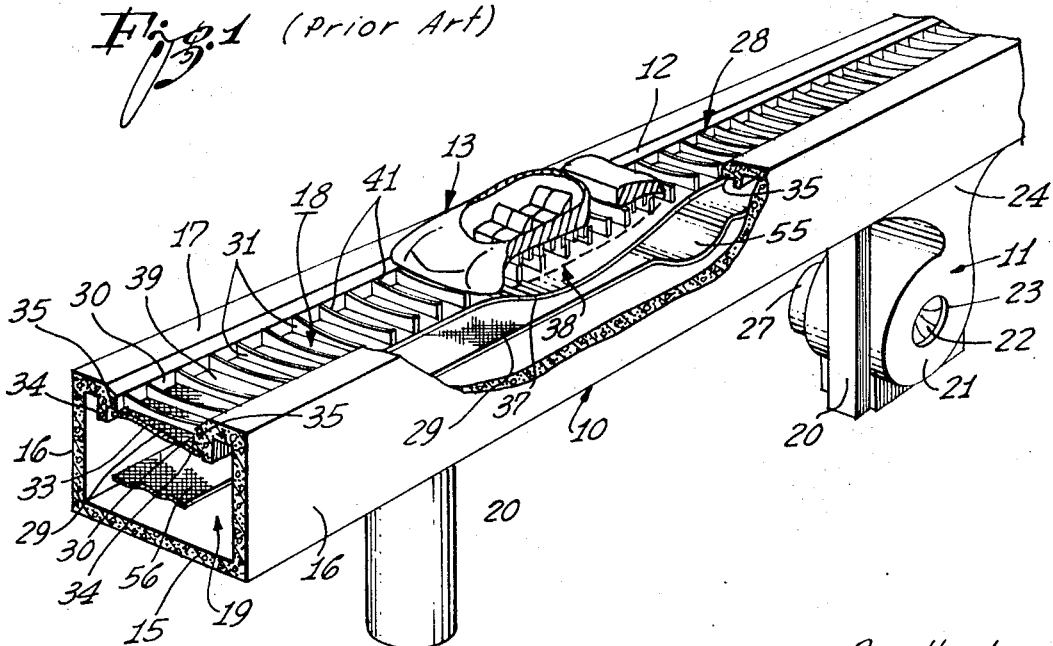
FIG. 1 is a perspective view showing a portion of the transportation system disclosed in the aforesaid patent, the representation being useful in describing the general concepts of the invention.

The prior art transportation system shown in FIG. 1 comprises generally a roadbed 10, a blower 11 for inducing a flow of air under a relatively low pressure along the roadbed, a grating and belt assembly 12 which creates a traveling cushion of pressurized fluid movable longitudinally along the roadbed, and a vehicle 13 which is positioned over the assembly 12, and which is spaced therefrom by the cushion of pressurized air escaping from the roadbed, and propelled thereby along the roadbed. The term "pressurized air" or "pressurized fluid," as used herein, actually refers to a pressure differential and it may represent a positive pressure or a vacuum pressure, as will become evident as the description proceeds.

The roadbed 10 is shown as a U-shaped or channel structure preferably of reinforced or prestressed concrete. The same is shown with a bottom wall 15, sidewalls 16 extending upwardly from the bottom wall, and in reaching upper flange portions 17 which define a longitudinal slot or space 18. The interior 19 of the channel structure constitutes a duct. The columns 20 represent but one manner of supporting the roadbed since an overhead structure, or trenched air plenum, for example, may be provided if so desired.

Figure 3:
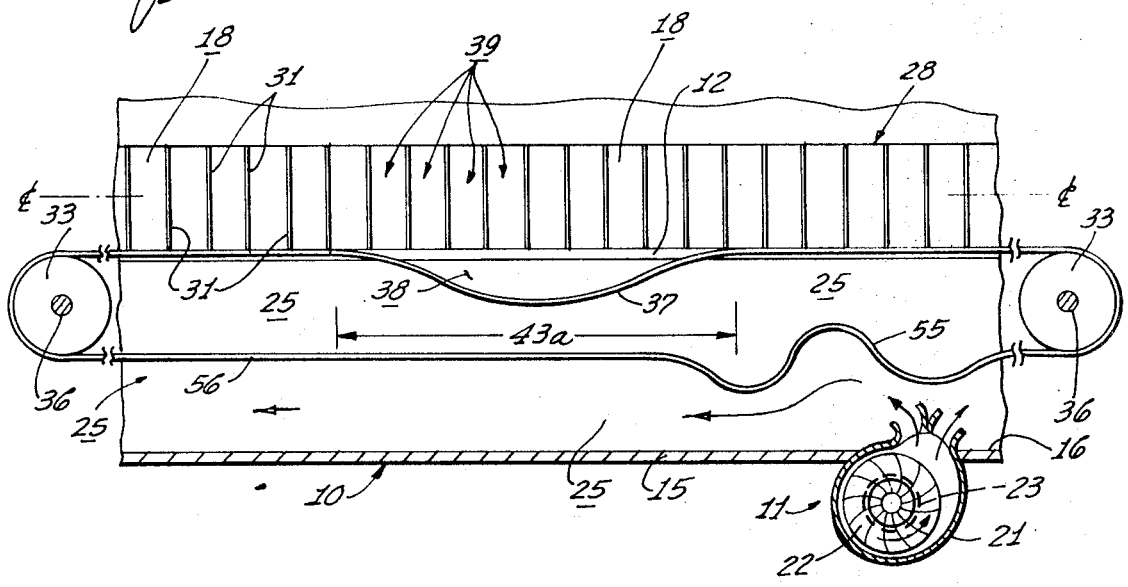
FIG. 3 is a somewhat schematic section taken along the lines 3-3 of FIG. 2 and showing the operation of the valving flexible belt which is included in the system.

The blower 11 is shown as a single fan. In practice, as many fans as may be required are provided along the length of the roadbed. Each such fan, in usual ways, may be provided with a scroll housing 21 and an impellor 22 which draws atmospheric air into an intake 23 and discharges the same under pressure into a longitudinal passage 25 (FIG. 3). Power means, such as an electric motor 27 (FIG. 1), may be provided to operate the impellor 22.

The grating and belt assembly 12 comprises the combination of the roadbed 10, and a valve grating 28, a valve belt 29, and the vehicle 13. The roadbed 10, insofar as it constitutes a component of the traveling wave valve, serves as the body of the valve, and the vehicle 13 constitutes a component which is necessary for the operation of the valve. As previously pointed out, the roadbed 10 has a longitudinal top slot or space 18 between the flange portions 17 of the channel structure of the roadbed.

The valve grating 28 fits into the slot 18 and spans the slot, the grating being secured to the opposite edges 30 of the flange portions 17. The grating is largely open and, in the illustrated example, is shown as a series of transverse members 31 forming vanes. The lower edges of the vane members 31 are coplanar.

The valve belt 29 comprises an endless pliable member which is impervious to air. As shown in the prior art embodiment of FIG. 1, the belt 29 is disposed in a horizontal plane, with an upper portion extending along the roadbed and under the lower edges of the vane members 31.

Figure 2:
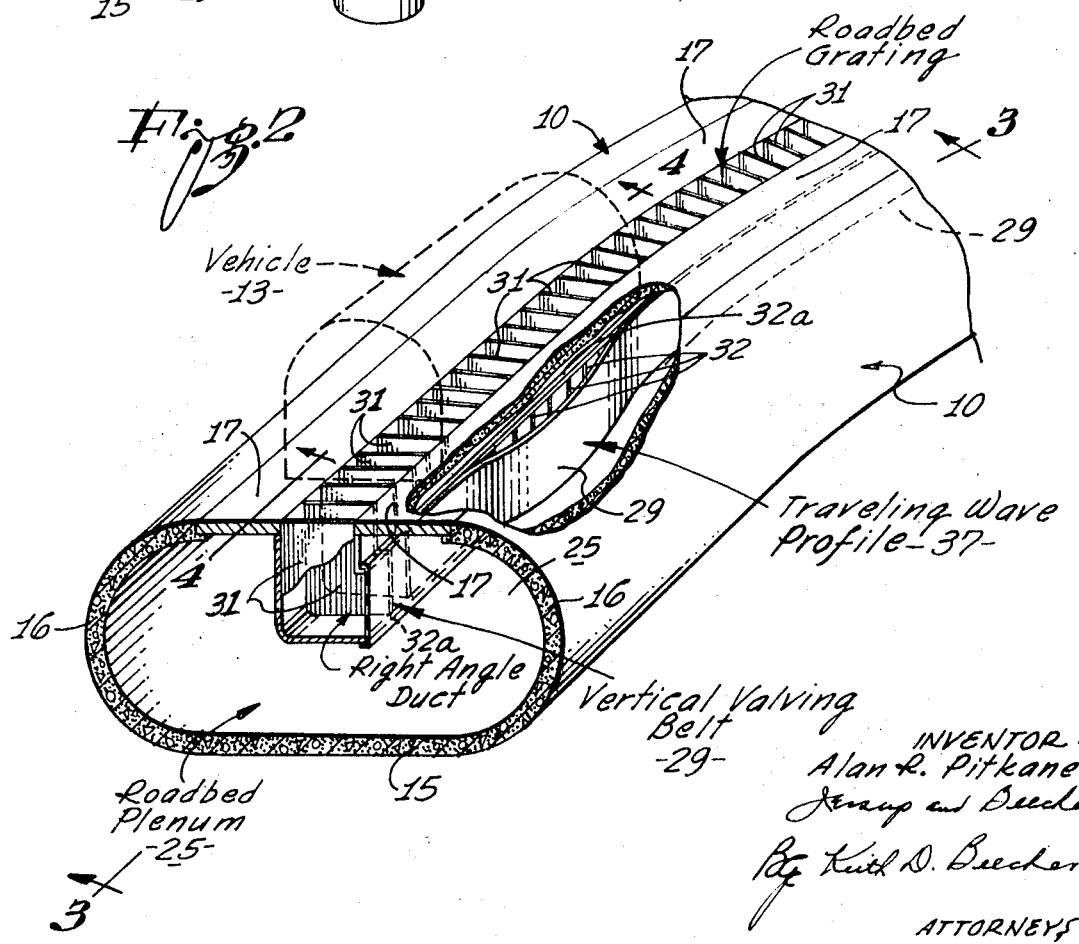
FIG. 2 is a perspective view showing a portion of the system of FIG. 1, but modified to incorporate the concepts and teachings of the present invention.

In accordance with the concepts of the present invention, and as shown in FIG. 2, the bottom wall 15 and sidewalls 16 of the roadbed 10 form a duct or plenum chamber 25 as in the previous embodiment. The walls 16 may be arcuate in shape, if so desired, as shown in FIG. 2. The upper flange portions 17 define the longitudinal slot or space 18 as in the previous embodiment, and a grating comprising a plurality of transverse vane members 31 extends across the top slot or space 18. However in the embodiment of FIG. 2, the vane members 31 each has a curved or L-shaped configuration, so as to define a series of L-shaped ducts extending along the length of the roadbed and terminating inside the plenum chamber 25 in a vertical plane constituted by the inner edges 32 of the vanes. Upper and lower rims 32a are provided adjacent the inner edges 32 and extending along the length of the plenum chamber 25. The valving belt 29 in the embodiment of FIG. 2 is, therefore, disposed in a vertical plane, and is held against the edges 32, and upper and lower rims 32a, by the pressure created in the plenum chamber 25 by the blower 11.

As shown in FIG. 3, for example, the belt 29 is looped over a pair of pulleys 33 which are longitudinally spaced along the roadbed, and which are positioned so as to produce some slack in the belt. The belt 29 is wider than the space between rims 32a of the vane members 31, so that it not only engages the inner edges 32 of the vanes, but it also engages marginal rims 32a, as shown in FIG. 2. The pulleys 33 in FIG. 3 are mounted to turn freely on vertical shafts 36, each pulley turning according to the manner in which the slack is being formed in the belt 29. It will be understood that the air pressure in the plenum chamber 25 is sufficient to support the belt 29 against the inner edges 32 of the vanes and in sealing engagement with the marginal edges 32a. The pulleys and return loop of FIG. 3, of course, constitute but one technique for maintaining the belt in its proper relationship in the system.

Since the adjacent portion of the belt, due to the slack in the belt, may buckle or undulate only in a direction away from the edges 32 and 32a, the traveling wave belt may be opened only by inducing such a buckling or undulation 37 in the adjacent portion of the belt. The undulation causes localized spaces to be formed between both the marginal edges 32a and the belt, enabling the pressurized air in the plenum chamber 19 to escape past the edges of the belt and into the area 38 formed by the buckle or profile portion of the belt, and through the spaces 19 between the grating or vane members 31.

The pressure supplied by the blower 11 is made sufficient to prevent a complete loss of pressure head in the passage 25 as the pressurized air escapes through the spaces 39. The size of the area 38 formed by the buckling of the belt, the cushion clearance height of the vehicle from the roadbed, and the size of the vehicle propulsive orifice 53 (FIG. 4), are designed so as to limit the escape of pressurized air to a degree sufficient to retain such a head.

Figure 4:
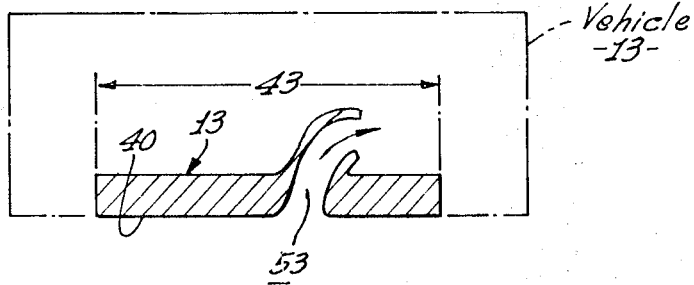
FIG. 4 is a somewhat schematic section of the vehicle itself, taken along the line 4-4 of FIG. 2, and showing the manner in which escaping fluid is received into the vehicle and used to propel the vehicle in the forward direction.

The vehicle 13 which, actually, is a slide in the illustrated embodiment, has an under surface 40 shown in FIG. 4, with the aforesaid propulsive orifice 53. The under surface 40 conforms generally to the form of the upper edges of the grating vane members 31, thereby minimizing the space which is formed between the surface 40 and the upper edges of the grating vane members when the vehicle is being supported on an air cushion formed in the space.

In practice, the vehicle length 43 is made to be somewhat smaller than the length 43a of the wave profile 37 of the belt 29. Disposal of the vehicle in near and overlapping relationship with the wave profile, causes the wave 37 to index a position centered with the vehicle as shown, for example, in FIG. 1. This is a stable position for the wave profile 37 and the same seeks to maintain this position until a displacement of the vehicle longitudinally will cause the wave profile to index or track the vehicle and reestablish a centered, symmetrical relationship between the vehicle and the wave profile.

It will be appreciated that the traveling wave valve described above utilizes only the power needed to produce the desired pressure in the duct 19 and the input power from the vehicle to cause movement of the wave form. As the wave form moves along the roadbed following the vehicle, successive portions of the belt move away from the valve grating 28 and form the wave profile 37, and then return to engagement with the grating. It will be clear that the belt does not slide along the grating but rather relocates during passage of the wave by a distance equal to the length that was added to the belt to produce the wave. Thus, the linear motion of the belt is intermittent and very slow, although the velocity of the vehicle along the roadbed is continuous and much higher.

As shown in FIGS. 1 and 4, and as mentioned above, the vehicle 13 is provided with a propulsion orifice 53 which receives air from underneath the vehicle, and directs it rearwardly thereby to propel the vehicle in a forward direction, the wave 37 following, as described above. Externally applied power may also be used to propel the vehicle on its cushion of escaping air. Also, power for this purpose may be carried by a power plant on the vehicle itself.

Since the belt 29 may be of a length to include two or more wave profiles, spaced as desired or uniformly, several vehicles, or other articles, each in the form of a separate slide unit, may be propelled along the roadbed. The slack of the wave profiles which pass over the pulley 33 toward which the travel is taken up in the return run of the belt and provides slack 55 in the return run 56. Such slack provides sufficient belt length with which to form additional wave profiles to operate in conjunction with additional vehicles 13, as described above.

What I claim is:

1. A transportation system comprising: a longitudinal roadbed having a longitudinal passage and provided with upper flanges extending inwardly to define a slot open to said passage and to the atmosphere and extending along the roadbed; a grating spanning across said slot and extending into said passage to define a series of transverse air-passing ducts along the roadbed having entrances disposed in vertical uniplanar relationship, and defining marginal edges above and below said entrances; a flexible air-impervious belt having a forward run disposed in a vertical plane and positioned adjacent said vertical entrances of said air-passing ducts, slack being provided in the longitudinal extent of the belt and forming an undulation therein; a slide member positioned above said grating; and means for creating air pressure in said passage which is effective to press said run of said belt against said vertical entrances with its marginal edges at both ends of the undulation in air-sealing contact with said marginal edges of said air-passing ducts; the slide member being in the path of escape of air from said passage, around the edges of the undulated portion of the belt, and through the grating to form an escaping air cushion for said slide member, said slide member being static due to symmetry of pressures on both sides of the undulation.

2. The transportation system defined in claim 1 and which includes means for propelling the slide member longitudinally, the undulation in said belt upon movement of the slide member out of symmetrical relationship with the undulation being subject to an imbalance between the air pressure on the forward and trailing ends of the undulation and the asymmetrical pressure on the undulation to cause the undulation to follow after the slide member seeking to restore balance of pressure on the undulation and, thereby, keeping the air cushion beneath the traveling slide member.

3. The transportation system defined in claim 2 in which said slide member is provided with means subject to the pressure of the escaping air to propel the slide member along the roadbed.

4. A transportation system comprising: a flexible belt having a forward run portion disposed in a vertical plane and having slack therein which forms a wave form in a portion of the forward run of the belt; a grating adjacent said forward run of said belt; air pressure means biasing other portions of said forward run of said belt into air-intercepting engagement with the grating while pressure air is passing around the edges of the wave form in the belt and through the grating; and a slide member positioned above the grating and supported by said pressure air; the wave form of the belt following longitudinal displacement of the slide member, and the pressures on opposite faces of the wave form becoming unbalanced due to the symmetry of opposed pressures being disturbed by such slide member movement.

5. The transportation system defined in claim 4 and which includes means for propelling the slide member longitudinally.

6. The transporting system defined in claim 5 in which said slide member is provided with means subject to the pressure of escaping air to propel the vehicle.

7. In a conveyor system having a slide member, means for supporting said slide member on a traveling air cushion, said means including: a flexible belt having a vertically disposed forward run and having slack therein; means for producing air pressure to form a portion of the forward run of the belt into a bulging wave between two other belt portions; and a grating having vertically disposed entrances and horizontally disposed exits and interposed between the forward run of said belt and the slide member, the air pressure pressing the other portions of said belt against the entrances of said grating and said grating passing pressure air which passes around the longitudinal edges of the bulging wave form of the belt to form said cushion.

8. In the conveyor system according to claim 7 in which, upon longitudinal movement of the slide member, said wave form follows to maintain said air cushion beneath said slide member.

75